United States Patent
Demant et al.

(10) Patent No.: US 8,516,364 B2
(45) Date of Patent: Aug. 20, 2013

(54) VIEW MODEL ASPECTS OF COMPONENT OBJECTS

(75) Inventors: Hilmar Demant, Karlsdorf (DE);
Sebastian Droll, Heidelberg (DE);
Joachim Fitzer, Schriesheim (DE);
Ioannis Grammatikakis, Maxdorf (DE); Jan Heiler, Walldorf (DE);
Juergen Sattler, Wiesloch (DE); Frank Schertel, Mannheim (DE); Markus Viol, Walldorf (DE); Thorsten Weber, Mannheim (DE)

(73) Assignee: SAP AG, Walldorf (DE)

( * ) Notice: Subject to any disclaimer, the term of this patent is extended or adjusted under 35 U.S.C. 154(b) by 268 days.

(21) Appl. No.: 12/871,426

(22) Filed: Aug. 30, 2010

(65) Prior Publication Data
US 2012/0054603 A1 Mar. 1, 2012

(51) Int. Cl.
*G06F 17/00* (2006.01)

(52) U.S. Cl.
USPC .......................................................... 715/247

(58) Field of Classification Search
USPC ....................................................... 715/247
See application file for complete search history.

(56) References Cited

U.S. PATENT DOCUMENTS

| | | | | |
|---|---|---|---|---|
| 6,272,493 | B1 * | 8/2001 | Pasquali | 709/219 |
| 2006/0212803 | A1 * | 9/2006 | Arokiaswamy | 715/520 |
| 2007/0136337 | A1 * | 6/2007 | Sah et al. | 707/101 |
| 2008/0281944 | A1 * | 11/2008 | Vorne et al. | 709/218 |

OTHER PUBLICATIONS

Maloney, "Implementing HTML Frames W3C Working Draft Mar. 31, 1997", pp. 1-14.*

* cited by examiner

*Primary Examiner* — Amelia Rutledge
(74) *Attorney, Agent, or Firm* — Brake Hughes Bellermann LLP (57) ABSTRACT

Displaying a plurality of objects on a grid. Metadata indicates an object's display column and span. A lowest position is determined from objects displayed in the same column span. The object is displayed in the column span at the lowest position. A lowest position is determined after the last object is displayed. The grid is resized to minimize whitespace beyond the lowest position to border whitespace. Display overlay of first and second graphical objects. When the first object is directly manipulated in a GUI, the second object is automatically manipulated the same way. When the first object is scrolled in a first direction by a first amount, the second object is automatically displaced opposite the first direction by the first amount. When the first object is resized in a first dimension by a first amount, the second object can be automatically resized by the first amount in the first dimension.

12 Claims, 10 Drawing Sheets

VIEW MODEL ASPECTS OF COMPONENT OBJECTS

TECHNICAL FIELD

This description relates to client/server based applications, and the visualization and layout of component objects in a client side graphical user interface.

BACKGROUND

Today, business is often conducted via portable and hand-held computers. Devices such as smart phones, personal digital assistants, and tablet based computers and netbooks, to name just a few, have a small physical footprint yet a rich graphical user interface. As such, they are well suited for data presentation and remote business use. While the computing power of such devices is considerable, it nonetheless pales in comparison to the computing power of a server or server farm. The same can be said of desktop and laptop computers. While such computers provide rich graphical user interfaces and posses considerable computing power in their own right, absolute computing power pales in comparison to the computing power of a server or server farm. As a result, many computationally intensive applications are most effectively run on servers or server farms. Still, it is often convenient to remotely access the data that is output by such computationally intensive applications on small footprint, hand-held devices or on simple desktop or laptop computers. For example, a salesperson can benefit from having instant access to all of the sales records of his or her customers, including detailed records of orders placed, shipments made, invoices sent, and payments received over a period of several years. Depending on the number and size of the customers, such records can be voluminous, and maintaining and analyzing them can be a computationally intensive task that is best left to an enterprise server or server farm. Nonetheless, the salesperson may benefit from having instant access to and the ability to mine the sales information to address issues that may arise during a sales call or while working on his or her desktop preparing to make a sales call. Moreover, the enterprise can benefit by allowing the salesperson to have write access to the sales records from any remote computer, thereby allowing the sales person to enter new or useful sales information such as the name and contact information of a customer's new purchasing agent.

Achieving both of these goals, i.e., running data intensive applications on server farms where they are most efficiently run while providing access to the output of these applications on remote devices like laptops, desktops or smart phones where they may most urgently be needed, can be accomplished using a client-server computing paradigm. In this paradigm, a client application running on a remote device can interface with and control a server application running on an enterprise server or server farm. The client based application can send commands and data to the server, while the server can execute the commands and return requested or updated data to the client.

To visualize the information, a graphical user interface is generated on the client computer. The graphical user interface provides a graphical rendering of objects that are used to enter, store and manipulate the data that is exchanged between the client and server computers. For example, the graphical user interface may include text boxes to enter data, list boxes to display data lists, and edit controls to edit information. These can be used to enter data, format data, search for data and manipulate data both on the client computer and on the server computer.

SUMMARY

In one aspect, methods and apparatus for displaying a plurality of objects on a grid are disclosed. An object is received from among a plurality of objects. Metadata indicating a column in which the object should be displayed and a number of columns the object should span is also received. A lowest position is determined from other objects displayed on the grid in the same column or columns to be spanned by the object. The object is displayed on the grid in the column or columns to be spanned at the determined lowest position.

Implementations may include one or more of the following features. For example, each of the plurality of objects can be displayed in an order determined by metadata indicating a sequence in which the objects should be displayed. After the last of the plurality of objects has been displayed, a lowest position on the grid is determined from the objects displayed on the grid. The grid is then resized and displayed so that a minimum of whitespace appears beyond the lowest position. The minimum of whitespace is determined by the size of a border region of the grid.

In another aspect, methods and apparatus for overlaying the display of a first graphical object with the display of a second graphical object so that the first and second graphical objects appear to be an integrated graphical object are disclosed. The first graphical object can be displayed in a graphical user interface. The first graphical object can be incapable of displaying hypertext mark-up language, and can be configured to be directly manipulated in the graphical user interface. The second graphical object can be displayed in the graphical user interface. The second graphical object can be capable of displaying HTML content, and can be configured to be automatically manipulated by the computer when the first graphical object is directly manipulated in the graphical user interface.

Implementations may include one or more of the following features. For example, the second graphical object can include an iframe. The second graphical object can also include a clipping frame that reveals a portion of the HTML content of the iframe. When the first graphical object is directly manipulated in a first manner in the graphical user interface, the second graphical object can be automatically manipulating in the same first manner. The first graphical object can be scrolled in a first direction by a first amount. The content of the first graphical object can be displaced in the graphical user interface by the first amount and in a direction that is opposite the first direction. The second graphical object can be automatically displaced in the graphical user interface by the first amount and in a direction that is opposite the first direction. The second graphical object can be automatically displaced by the first amount in a direction that is opposite the first direction by automatically displacing the iframe and the clipping frame by the first amount in a direction that is opposite the first direction. The first graphical object can be resized in a first dimension in the graphical user interface by a first amount. The second graphical object can be automatically resized in the graphical user interface by the same first amount in the same dimension.

A component object's view is the description of the user interface that binds to the data model and triggers event-handlers. A component object's data model describes the data structure, and binds the data structure to data on the backend data server. A component object's controller contains event-handlers for processing events within the user interface through various modes such as interactions with and queries of the backend application, script execution, and passing data to other objects in the user interface. A component object's declarative interface exposes the object's data ports, binding-capabilities and configuration to the user interface composition.

The value of a data field of a component object can depend on the values and properties of other component objects. For example, the value can be bound to and come from the data field of another component object, and can be updated when the value of the other component object's data field changes. Alternatively, the value of the data field can be provided by a script that runs a calculation rule for the data field. The script can be run to recalculate the value of the data field whenever an invalidation trigger indicates that an event in the user interface (e.g., a change in the value of another data field) requires the value of the data field to be recalculated. If the data field is a text field, its value can be statically translatable or dynamically computable from a saved text pool based on one or more textpool placeholders. Finally, the data field value can simply be a static default value for the component object.

DETAILED DESCRIPTION

Figure 1:
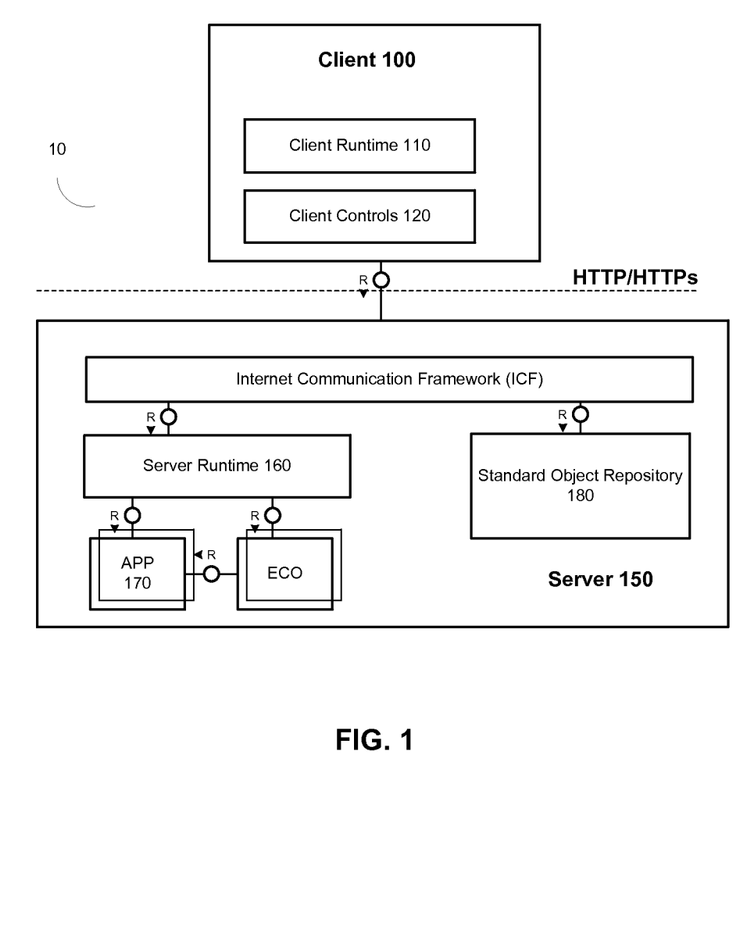
FIG. 1 is a block diagram of a system, including client and server computers, for executing an application using a client-server architecture.

FIG. 1 is a block diagram of a system 10 for executing an application using a client-server architecture. As shown in FIG. 1, system 10 includes a client computer 100 and a server computer 150. The client computer 100 runs a client runtime 110 that includes one or more controls 120. The server computer 150 runs a server runtime 160 and a backend application 170. The client runtime 110 generates and renders a graphical user interface (GUI) that allows a user of client computer 100 to graphically interact with and control the backend application 170 on server 150. The server runtime 160 communicates with both the client runtime 110 on client computer 100 and the backend application 170 on server 150. The server runtime 160 reads, writes, interprets, and translates data from backend application 170 into one or more declared UI component objects (see, FIG. 2) using a data model that is common to both the client runtime 110 and the server runtime 160. Preferably, the client runtime 110 is implemented as a browser plug-in, and executed as part of a browser running on client computer 100. Alternatively, a standalone client runtime (not shown) can be separately compiled, installed, and run independently of any browser running on client computer 100. Preferably, client runtime 110 and server runtime 160 communicate via hyper text transport protocol (HTTP), and exchange data using Java Script Object Notation (JSON). In other embodiments, client runtime 110 and server runtime 160 can communicate via secure HTTP (HTTP/s), and can exchange data using XML. Further details of client runtime 110 and server runtime 160 are provided below.

Figure 2:
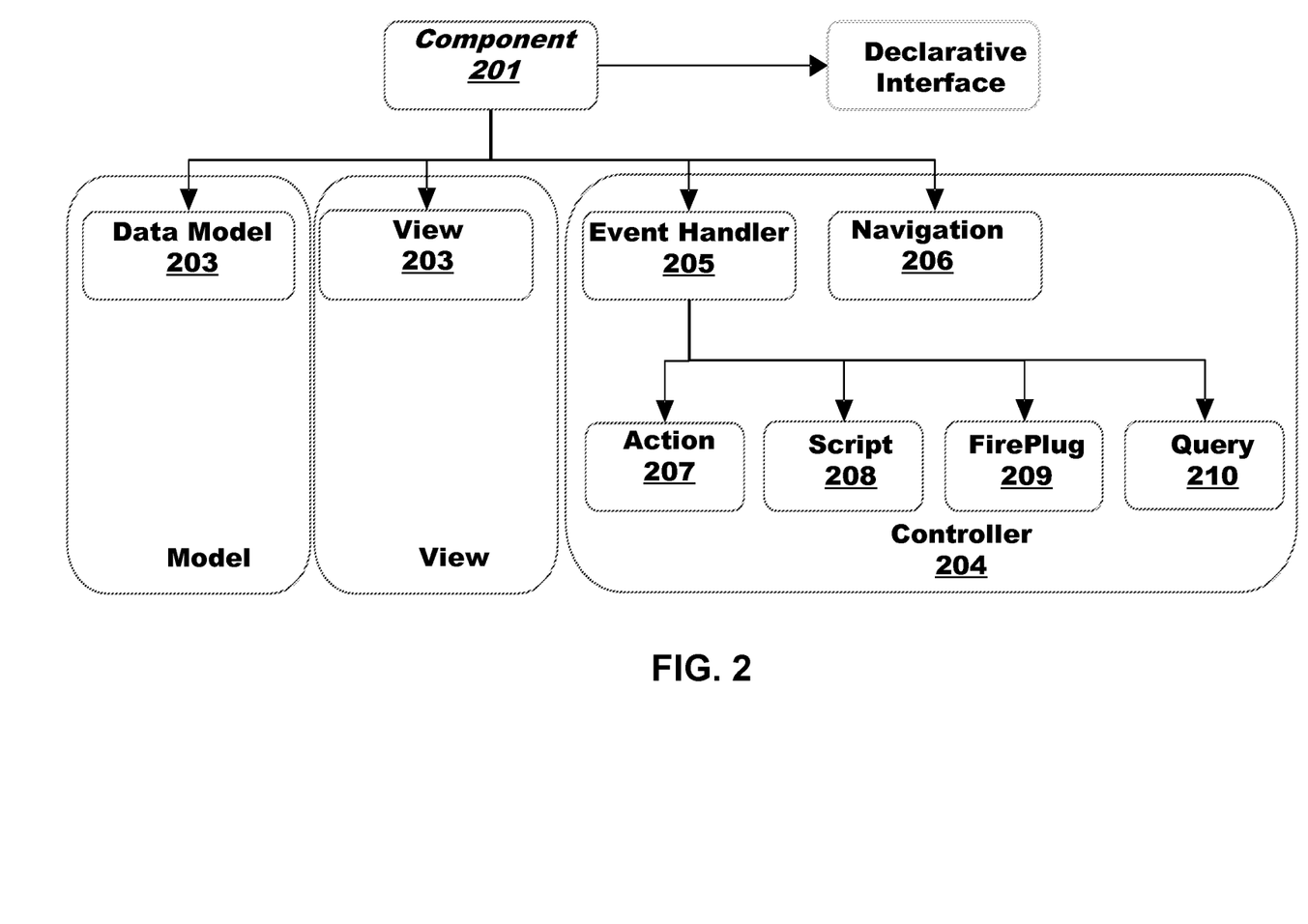
FIG. 2 is a schematic illustration of a declared UI component object.

FIG. 2 is a schematic illustration of a declared UI component object. UI component object 201 includes a data model 202, a view 203, and a controller 204. The data model 202 defines a universal data structure that is abstracted from the particular data and logic of the backend application 170. The view 203 describes the representation of the component object 201 and data from the data model 202 in a graphical user interface on the client computer 100. Through the UI component's view 203, event-handlers can be triggered when a user interacts with the component object. The controller 204 provides various means for handling and manipulating the data that is defined in the data model 202 of the component object 201. In particular, the controller 204 includes one or more event handlers 205 and one or more navigation paths 206. The event handlers 204 interpret events that occur within the client runtime 110 or server runtime 160, and bind data fields in the component object 201 to data sources (e.g., backend application 170) per the data model 202. The event handlers 204 can bind data fields to data sources through actions 207 (e.g., calling a function in application 170), scripts 208, or queries 210 (e.g., querying the data source). Finally, the navigation paths 205 describe the mapping of operations and the flow of data between the component object 201 and other component objects in the client runtime 110, particularly when data in one component object depends on data in another component object. For example, if data in a component object 250 (not shown) depends on data in component object 201, controller 204 can include a navigation path 206 that connects component objects 201 and 250. Controller 204 can use the navigation path 206 to notify component object 250 when the data in component object 201 changes. Component object 250 can be embedded in component object 201, or component object 250 can be external to component object 201.

Each UI component object 201 is instantiated on both the client computer 100 and the server computer 150. Data in the client and server sides of the component object 201 are synchronized on an as needed basis. Thus, the client runtime 110 and server runtime 160 only exchange data that needs to be exchanged to maintain the current state of the UI and of the component objects 201 in both the client runtime 110 and the server runtime 160. Data fields in the client side of a component object 201 are bound to corresponding data fields on the server side of the component object, while data fields in the server side of the component object 201 are bound to data sources on the server 150 such as the backend application 170.

To improve system performance and preserve bandwidth on the communication channel between the client computer 100 and the server 150, only data that is currently needed or viewable is loaded from the backend application 170. For example, when data is retrieved from application 170 to populate a list object 201 on the client computer 100, the controller 204 for the list object 201 sends the current lead selection and other information from the current view 203 of the list object 201 to the server runtime 160. The server side list object 201 uses this information to query the application 170 for only those items in the list object 201 that are currently viewable in the view 203 of the client side list object 201. Similarly, if the client side list object 201 is a hierarchical list, the client list object 201 does not receive data needed to populate a child list object unless the child list object is the current lead selection of the client side list object 201. Thus, the child list object appears in a collapsed state when it is not the current lead selection in the client side list object 201, and appears in an expanded state when it is the current lead selection in the client side list object 201.

Changes made to data fields that are not in the current scope, focus, or lead selection of the user interface can nonetheless be made available to the client runtime 110 through a bound property framework. This framework allows the client runtime 110 to receive event notifications of changes that are made to out-of-scope or out-of-focus data fields by creating proxy objects having logical paths to the data fields. The client runtime 110 can be alerted to changes in the data fields monitored by the proxy objects regardless of whether the data fields are within the current focus, scope or lead selection of the client runtime 110. For example, a data model can consist of a sales order containing a list of items being sold, which list can contain one or more sub-lists containing details about each of the items on the sales list. If a user wanted to monitor changes made to the detailed sub-list (e.g., so the only items on the list are items that are made of stainless steel), the user could create a proxy object within the client runtime with a logical path such as "SalesOrder/Items/Details/Composition" that would alert the user to changes made to the composition of items on the list, regardless of whether the items were currently within the focus of the user interface.

Figure 3:
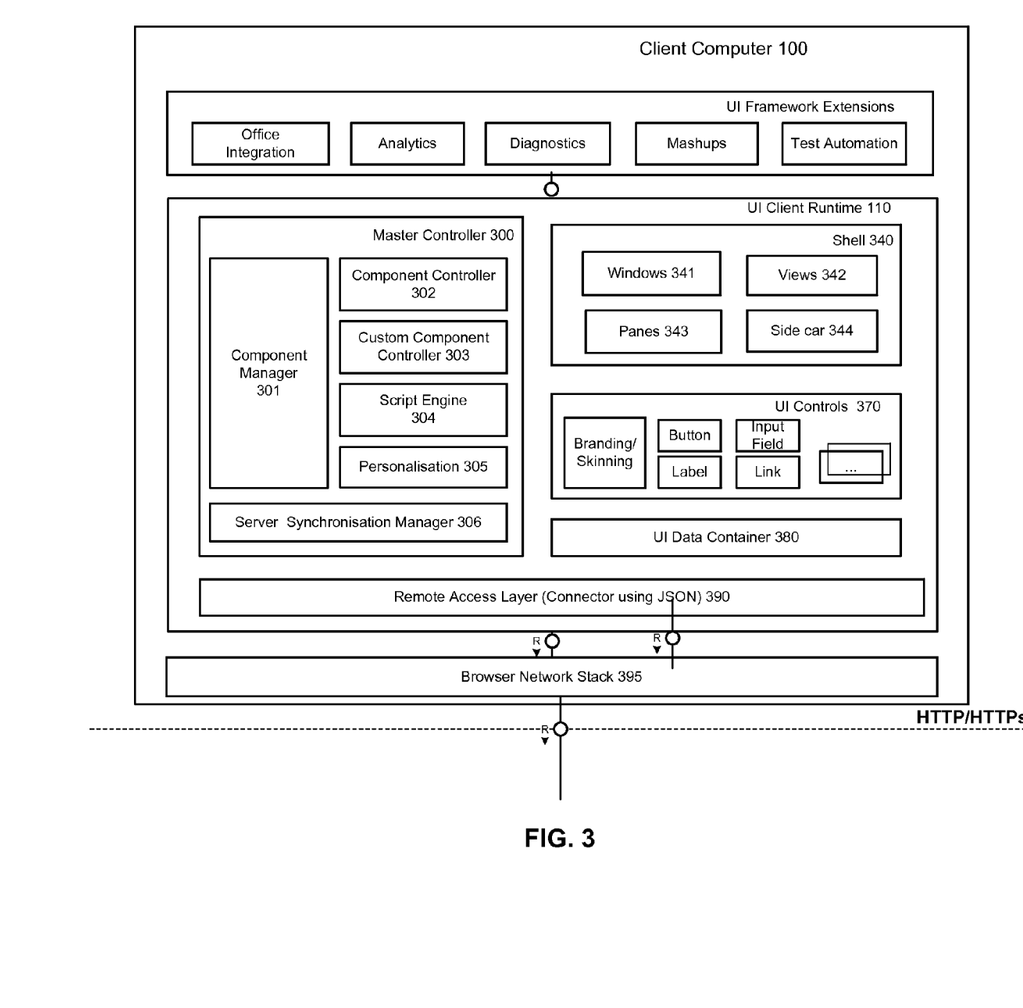
FIG. 3 is a block diagram of a client computer, including a client runtime that is capable of generating a UI for interacting with an application running on a server computer.

FIG. 3 is a block diagram of a client computer 100, including a client runtime 110 that is capable of generating a UI for executing an application 170 running on a server 150 in a client-server architecture. As shown in FIG. 3, the client runtime 110 includes a master controller 300, a shell 340, one or more UI controls 370, a UI data container 380, and a communications interface capable of establishing communication with a server runtime 160 on the server 150. In one implementation, the communications interface includes a JSON connector 390 and a browser stack 395. The master controller 300 includes a component manager 301, one or more component controllers 302 or custom component controllers 303, and a server synchronization manager 306. The master controller 300 may also include a scripting engine 304 and a personalization engine 305. The component manager 301 instantiates component objects 201 (see, FIG. 2) that make up the UI for the client runtime 110, and triggers the initialization of component objects 201 with data that is obtained from a data source such as backend application 170 running on server 150. The component objects 201 can be constructed from standardized UI controls 370, which can be obtained from a standard object repository 450 (see, FIG. 4) that is located on server 150. All component objects 201 in the client runtime 110 can be composed from the standard UI controls 370 or from other component objects 201. The top-level component object in the client runtime 110 can render a shell 340, which can consist of various windows 341, component object views 342 (i.e., views 203 of component objects 201), panes 343 and side cars 344 for personalization and help.

When the component manager 301 instantiates a component object, it also instantiates a controller 302 or 303 for the component object (i.e., a controller 204 for each component object 201 as shown in FIG. 2). The component manager 301 instantiates a standard component controller 302 for each UI control 370 and a custom component controller 303 for each composite component object (e.g., each component object that consists of two or more UI controls 370 or other UI component objects). As explained above in reference to FIG. 2, each component controller 302 or 303 binds the data fields of its component object to a data source (e.g., application 170) through an event handler 205 according to a data model 202. If data is bound to a component object 201 through a script, controllers 302 or 303 can trigger script engine 304 to execute that script. Each controller 302 or 303 can also trigger a refresh request and roundtrip data exchange with the server runtime 160 upon detecting a change to the data that is bound to its component object. These refresh requests and data exchanges are managed by a synchronization manager 306. The synchronization manager 306 identifies any data changes in a component object in the client runtime 110, and sends a refresh request to the server runtime 160 to reflect that data change in the corresponding server side component object.

Figure 4:
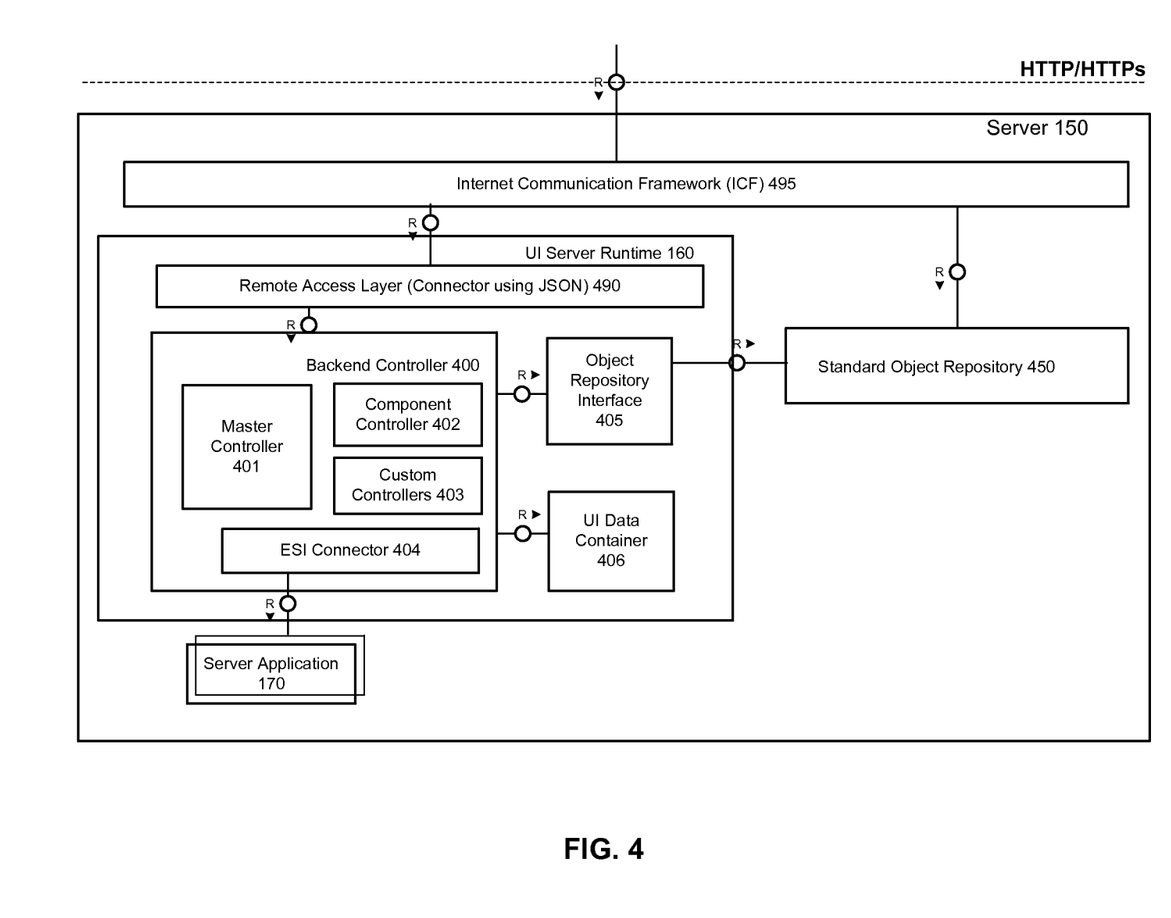
FIG. 4 is a block diagram of a server computer, including a server runtime that interfaces a client runtime running on a client computer with a data source running on the server.

FIG. 4 is a block diagram of a server 150, including a server runtime 160 that interfaces a client runtime 110 running on a client computer 100 with a data source such as an application 170 running on the server 150. The server runtime 160 includes a backend controller 400, an object repository interface 405, and a communications interface that is capable of connecting the server runtime 160 with a client runtime 110 on the computer 100. In one implementation, the communications interface includes an Internet Communications Framework 495 and a JSON connector 490. The backend controller 400 includes a master controller 401, one or more component controllers 402 or custom controllers 403, and a connector 404 to the application 170 running on the server 150. The object repository interface 405 connects the server runtime 160 with a standard object repository 450. The standard object repository 450 contains standardized UI component objects and controls, including standard data models that bind the data in the component objects and controls to a data source on server 150 such as application 170.

When a client runtime 110 is initialized on client computer 100, the client runtime 110 requests one or more UI component objects (which may be controls) from the server runtime 160, receives and instantiates the one or more UI component objects on the client computer 100, and requests initialization of the one or more component objects through the server runtime 160. When the server runtime 160 receives a request for a UI component object from the client runtime 110, it directs the request to the master controller 401. The master controller 401 retrieves the component object and its data model from the standard object repository 450, sends the component object and its data model to the client runtime 110. The master controller 401 also creates a component controller 402 or custom controller 403 within the service runtime 160, as well as a data container 406 for the component object. The data container 406 stores data for the component object in a data structure defined by the component object's data model.

When the server runtime 160 receives the request to initialize the component object from the client runtime 110, it again directs the request to the master controller 401. The master controller 401 sends the request to the controller 402 or 403 of the component object. The controller 402 or 403 retrieves the initialization data from a data source on server 150 such as application 170, stores the data in the data container 406 for the component object, and sends the data to the synchronization manager 306 in the client runtime 110 by way of the master controller 401. The synchronization manager 306 in the client runtime 150 in turn sends the data to the controller 302 or 303 of the client side component object, which writes the data to the client side data container 380 in the client runtime 110.

Subsequently, whenever the synchronization manager 306 on the client runtime 110 requests a refresh or roundtrip data exchange for a client side component object, the server side controller 402 or 403 for that component object receives and processes the request. For example, when data in a client side component object 201 is changed in the client runtime 110 (e.g., via user interaction), an event handler 205 in the controller 204 of the client side component object 201 sends the changed data to the synchronization manager 306 in the client runtime 110. The synchronization manager 306 asynchronously collects and sends the changed data to the master controller 401 in the service runtime 160. The master controller 401 sends the changed data to the controller 402 or 403 for the corresponding component object in the server runtime 160. The controller 402 or 403 receives the changed data, updates its data container 406, and performs any other actions indicated by the controller's event handler. Such actions may include sending the data to the application 170, calling a function in the application 170, or querying the application 170. In addition, controller 402 or 403 receives data from the application 170, updates the data container 406 for the component object, and sends the updated data to master controller 401 in the service runtime 160. Master controller 401 sends a message to the synchronization manager 306 in the client runtime 110 that includes the updated data. The synchronization manager 306 in the service runtime 150 in turn sends the updated data to the controller 302 or 303 for the client side component object. The controller 302 or 304 then writes the updated data to the client side data container 380 for the component object to complete the roundtrip data exchange for the refresh request.

Figure 5:
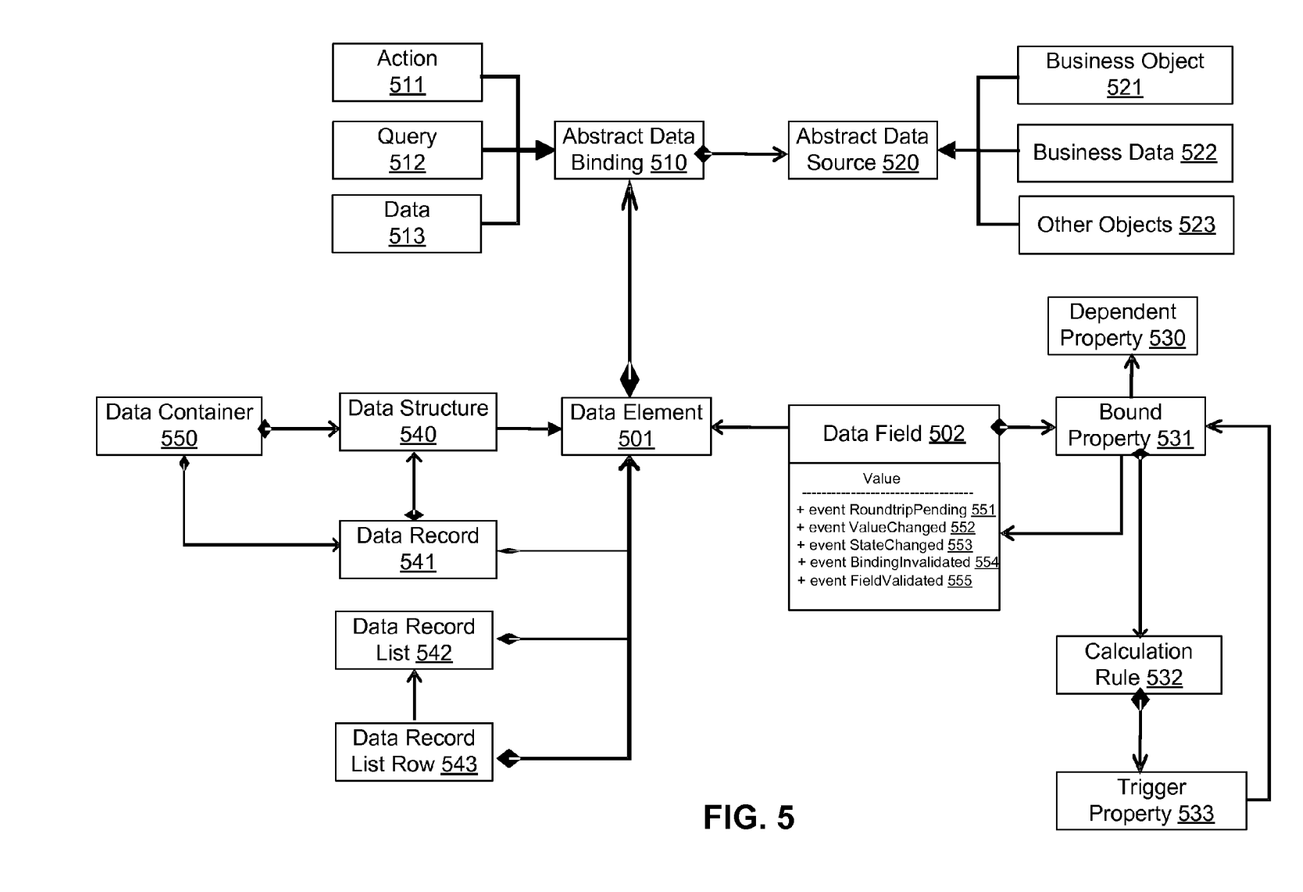
FIG. 5 is a schematic illustration of a class diagram showing the abstracted data model of a component object in the client runtime.

FIG. 5 is a schematic illustration of a class diagram showing the abstracted data model of a component object in the client runtime. The data model 202 defines the attributes for a data element 501 within a UI component object 201. For example, the data model 202 defines the binding 510 between the data element 501 and a data source 520. The data source 520 can be a backend application or business object 521 running on a remote server (e.g. application 170), an object or function within such an application 522, or another component object 523 in the client runtime 110. The binding 510 between the data element 501 and the data source 520 expresses a particular path to the data source 520. The path can be an action 511 such as a call to particular function within the data source 520, a query 512 of the data source 520, or a pointer to a particular data element or object 513 within the data source 520.

As further shown in FIG. 5, each data element 501 can be one part of a larger data structure 540 in the data model 202 of the component object 201. The client runtime 110 and server runtime 160 can access this data model 202 through a data container 550. For example, client runtime 110 can access the data model 202 of component object 201 through data container 380 shown in FIG. 3, while server runtime 160 can access the data model 202 through data container 406 shown in FIG. 4. The data structure 540 can organize the individual data elements 501 that make up component object 201 into data records 541 such as lists 542 or list rows 543.

As also shown in FIG. 5, each data element 501 includes a data field 502 that can hold the value of the data element. The value of the data field 502 can depend on or be bound to additional information or sources of data as indicated in a bound property field 531. For example, the value of the data field 502 can depend on the value of data in another data element as indicated in a dependent property field 530. In addition, the value of the data field 502 can depend on one or more calculations that are indicated in a calculated property field 532. The calculated property field 532 can point to a script that defines the calculations that are needed to compute the value of data field 502 from the information that is available from data source 520 and/or from any other data elements on which the value of data field 502 depends (e.g., as indicated in the dependent property field 530). Data field 502 can also be a text field. The text field can be filled with text pool entries based on the value of other data fields as indicated by the bound property field 531 or the dependent property field 530. This allows the value of data field 502 to consist of dynamically composed text that changes when the value in the dependent data fields changes.

When the value of data field 502 is bound to other information such as a calculation 532 or the value of a data field in another data element, one or more triggers 533 can recalculate the value of data field 502 or flagged data field 502 as invalid when the value of a bound property 531 such as a calculated property 532 or a dependent property 530 has changed. For example, if the value of data field 502 is the sum of the values from two or more independent data fields, a trigger 533 can recalculate the sum and update the value of data field 502 when the value of at least one of the independent data fields changes.

The calculated property field 532 can be defined so that certain calculations can be performed on client computer 100 rather than on server computer 150 to preserve bandwidth on the communications channel that connects the client 100 and server 150 computers. For example, as discussed above, the value of data field 502 can be sum of the values of two other data fields in two other component objects in the client runtime 110. When the value of at least one of these data fields changes, the value of data field 502 can be immediately recalculated and updated in the client runtime 110 without having to wait for the value to be propagated to and synchronized with the corresponding component object on the server runtime 160. This not only saves bandwidth between the client 100 and server 150 computers, but increases the efficiency and responsiveness of the user interface in the client runtime 110 since accurate data is more readily available.

Finally, data field 502 can also include a plurality of flags 551-555 containing metadata that indicates the status of the data in data field 502. In particular, a round-trip pending flag 551 indicates when a change in the value of data field 502 has been propagated from the client runtime 110 to a corresponding component object 201 in the server runtime 160. A value change flag 552 indicates when the value stored in data field 502 has changed. This can occur, for example, when the value is recalculated based on a propagated change in the value of a dependent data field. The synchronization manger 306 (FIG. 3) can poll or monitor the value change flag 552 of component objects in the client runtime 110 to identify those component objects that need to exchange data with their corresponding component objects in the server runtime 160. Similarly, the master controller 401 (FIG. 4) can poll or monitor the value change flag 552 of component objects in the server runtime 160 to identify those component objects that need to exchange data with their corresponding component objects in the client runtime 110. A state changed flag 553 indicates when the state of the data in data field 502 has changed (e.g., from valid to invalid). A binding invalidated flag 554 indicates whether the binding 510 of the data element 501 to the data source 520 is valid. For example, the binding invalidated flag 554 can be set to invalid when the data source 520 (e.g., application 170) has crashed or is otherwise unavailable. This insures that only valid and fresh data is used and displayed in client runtime 110. Finally, a field validated flag 555 indicates when the value in the data field 502 is valid.

The graphical user interface displayed in the client runtime 110 can be configured based on declarations made in the views of its underlying component objects. These declarations can have default values defined in the data model 202 of the component objects themselves. These default values can be overwritten with data read from one or more configuration files at runtime. The declarations can indicate both how the views 203 of the component objects are arranged in the user interface, and how the views 203 of the component objects are used within the user interface. Declarations from different entities (e.g., SAP, an SAP partner, an SAP customer, and an end user) can be assigned different priority levels, thereby allowing the user interface to be defined with a base level of appearance and functionality that is uniform, and yet to be customizable according to the particular needs or preferences of an end user. For example, SAP declarations can be assigned the lowest priority level, and can be overwritten by declarations from SAP's partners, customers, and end users; SAP partner declarations can be assigned the next to lowest priority level, and can be overwritten by declarations from SAP's customers and end users; SAP customer declarations can be assigned the next to highest priority level, and can only be overwritten by end user declarations; and end user declarations can be assigned the highest priority level and cannot be overwritten. Of course, not all component object views are customizable, and the amount of customization can be limited so that, for example, only SAP, SAP partners, or SAP customers can override the default declarations for some component object views. In any event, the ability of different entities to override the default declarations of certain component object views allows customers and end users to "skin" the appearance of other users interfaces. For example, one end user can "skin" the appearance of another end user's graphical user interface by copying that end user's configuration files. Moreover, the end user can further refine or customize the "skinned" user interface by overriding various declarations for customizable component object views.

Icons for component objects that are used in the graphical user interface can be assigned based on the value of a dependent data field, thereby allowing icons to be dynamically assigned. Likewise, an enhanced identification region can be dynamically displayed in a component object's view. By default, the enhanced identification region is only displayed when the component object's view contains data that can be saved. Thus, the enhanced identification region is not displayed when the component object is first instantiated, but is displayed once data has been entered into the component object from the client runtime 110 or the server runtime 160. This default behavior can be overwritten, however, so that the component object's enhanced identification region is always shown, never shown or dynamically shown in the component object's view based on the state of the user interface or the values of other objects within the user interface.

Figure 6:
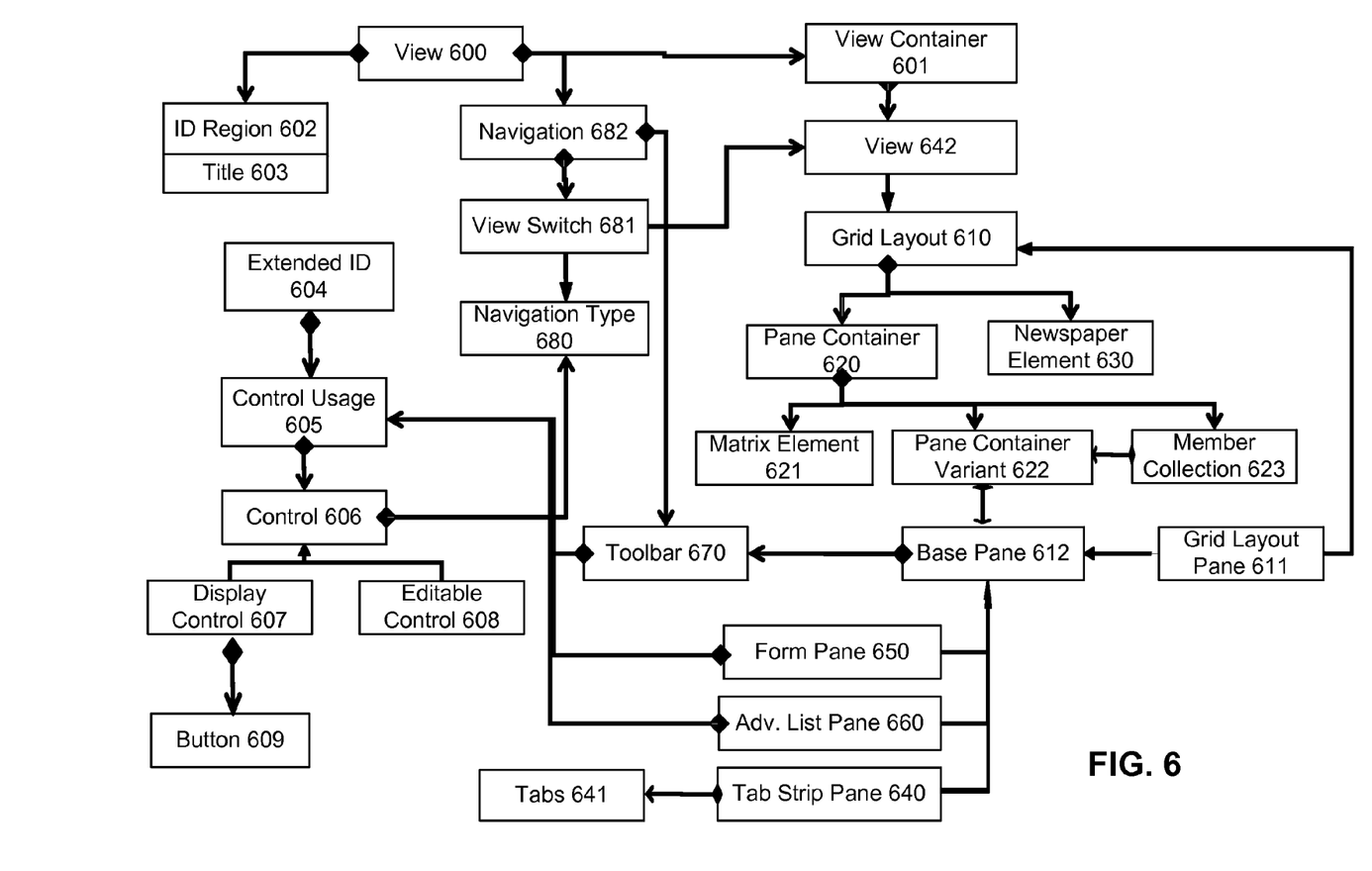
FIG. 6 is a schematic illustration of a class diagram showing the view of the user interface in the client runtime.

FIG. 6 is a schematic illustration of a class diagram showing the view of the user interface in the client runtime. As shown in FIG. 6, the view 600 includes an ID region 602 and a title 603. The data and metadata that are needed to render the view in the client runtime 110 is held in a view container 601. View container 601 can contain a plurality of different views 642 of component objects within the client runtime 110, and a grid layout 610 for displaying those views. Each view of a component object can be displayed in a pane in a grid layout 610, and the grid layout 610 can display these panes in either pane containers 620 or newspaper elements 630 depending on the nature of the grid layout 610 as explained more fully below in reference to FIGS. 8 and 9.

As shown in FIG. 6, pane containers 620 can display base panes 612 as matrix elements 621, pane container variants 622 or member collections 623. Variants of base pane 612 include toolbars 670, form panes 650, advanced list panes 660 and tab strip panes 640. Of course, tab strip panes 640 further include one or more tab elements 641 that can be displayed when the tab pane 650 is selected in the user interface. Toolbar 670 can include navigation controls 682 and a view switch element 681. When the view switch element 681 is toggled in the user interface, the view 642 of a component object within the user interface can change. For example, the view of the component object can be switched from background to foreground, or from being displayed in a pane container 620 in the grid layout 610 to being displayed in a newspaper element 630. Toolbar 670 can include other user interface controls 605, such as display controls 607 and editable controls 608. Display controls 607 can include, for example, buttons 609 such as radio buttons. Editable controls 608 can include, for example, text boxes. Whether particular controls 606 appear in the user interface can depend on the state of the user interface as recorded, for example, in the control usage 605. The control usage 605 allows dynamic control over certain properties of a component object view, such as the visibility of the extended identification region 604 or the ability to use a given control 606.

Figure 7:
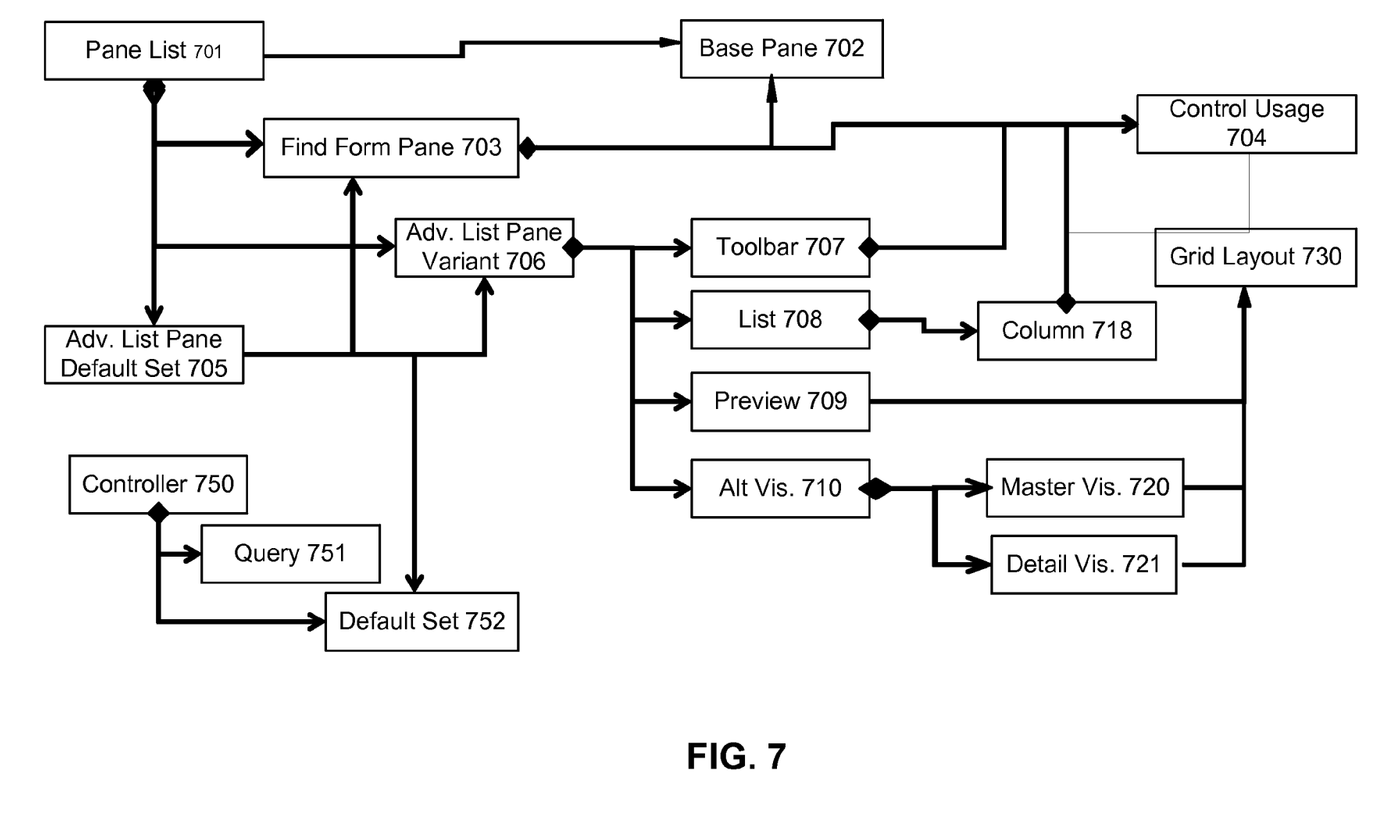
FIG. 7 is a schematic illustration of a class diagram showing the detailed structure of the advanced list pane object that is used to generate the master view of the client runtime user interface.

FIG. 7 is a schematic illustration of a class diagram showing the detailed structure of the advanced list pane object that is used to generate the master view of the user interface in the client runtime. The principle object of the master view, which can be dynamically composed, is the advanced list pane 701. The advanced list pane 701 can be displayed in a variety of ways as defined in the advanced list pane default set 705. The advanced list pane default set 705 indicates which objects in the advanced pane list should be displayed as base panes 702, find form panes 703 and variants of the advanced list pane 706, such as toolbars 707, lists 708, previews 709 and alternate visualizations 710. The alternate visualizations 710 allow objects in the advanced list pane 701 to be displayed in a grid layout 730 according to either a master visualization 720 or a detailed visualization 721 plan.

As indicated above, the user interface in the client runtime can be dynamically composed based on underlying declarations of its component views. Each component view can include metadata indicating where it should appear in a master grid in the user interface, including the row in which it should appear, how many rows it should span, the column in which it should appear, how many columns it should span, and the order or sequence in which it should appear. An automatic layout algorithm can use some or all of this information to fill a master grid containing a given number of rows and columns, which can also be defined. Two such layout algorithms are described below in FIGS. 8A and 9A. To highlight the different manner in which the component views are automatically displayed in panes of a master grid using the methods described in FIGS. 8A and 9A, schematic illustrations are provided in FIGS. 8B and 9B showing how nine component views having the same row, column, span, and sequence declarations are displayed.

Figure 8A:
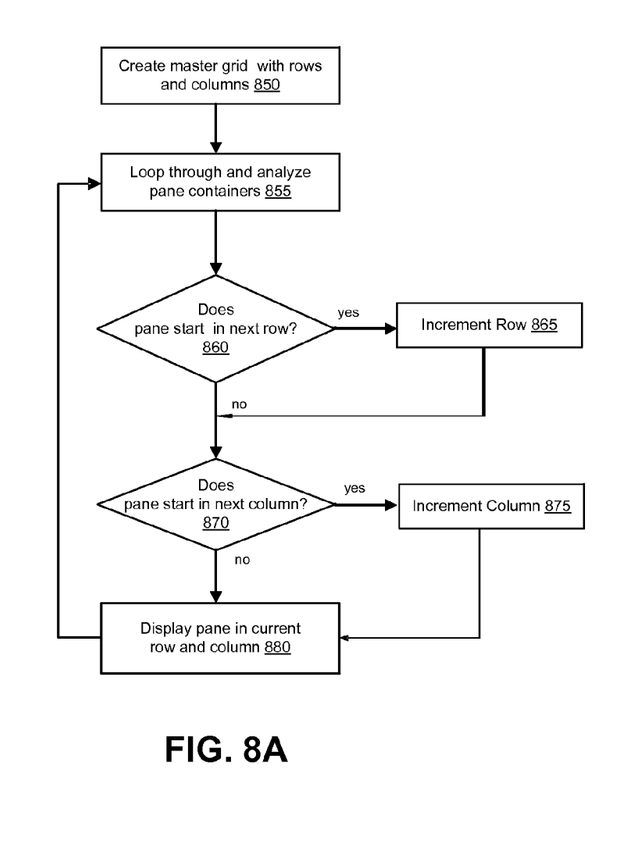
FIG. 8A is a flow chart illustrating a method for displaying component object views as panes in a master grid.

FIG. 8A is a flow chart illustrating a method for displaying component object views as panes in a master grid. First, a master grid is created with a given number of rows and columns (850). The number of rows and columns can be set as a default value, provided in a configuration file, or computed based on the number of component object views that need to be displayed. Next, all of the component object views are looped through and processed as panes to be seated in the master grid (855). As indicated above, each component object view can include declarations indicating the row and column in which the view should be placed, the number of rows and columns the view should span, and the order in which the view should be seated. This information is used to determine whether the view should be placed in a pane in the next row of the master grid (860). If so, the row number of the master grid is incremented (865). Next, the information is used to determine whether the view should be placed in a pane in the next column (870). If so, the column number of the master grid is incremented (875). Finally, the view is displayed in the master grid pane having the current row and column number (880), and the next component object view (if any) is analyzed to determine where it should be seated in the master grid (855). When all of the component views have been processed as described above, a master view such as shown in FIG. 8B results.

Figure 8B:
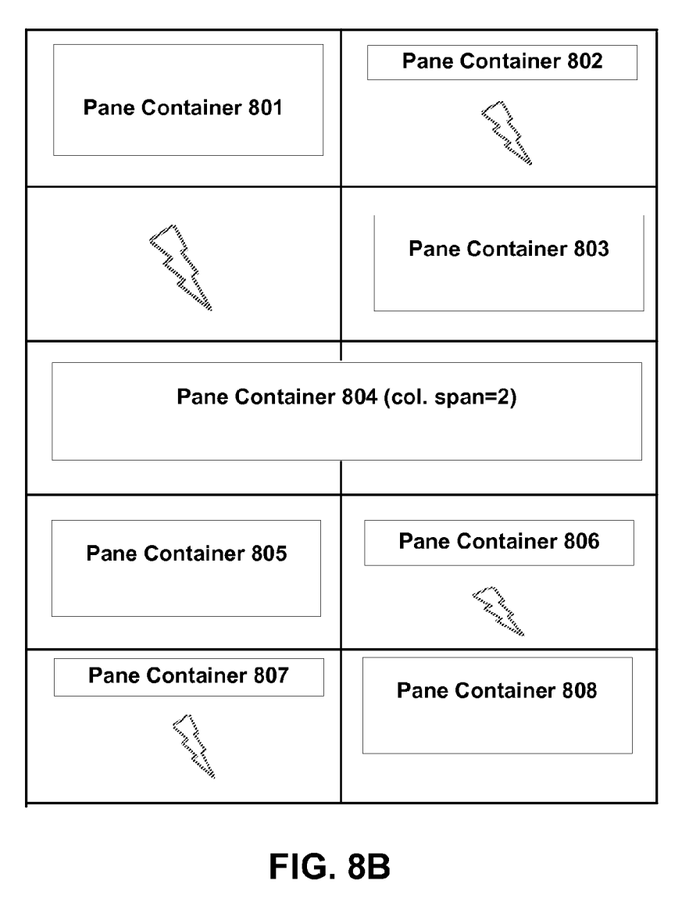
FIG. 8B is a schematic illustration showing how nine component views are displayed in the panes of a master grid according to the method of FIG. 8A.

FIG. 8B is a schematic illustration showing how nine component views are displayed in the panes of a master grid according to the method of FIG. 8A. As shown in FIG. 8B, each of the nine component views is displayed in one of eight pane containers labeled 801-808, which have been placed in the master grid according to the row, column, and column span declarations of the component views they contain. Note that because both row and column declarations are used to seat panes 801-808, a lot of white space appears throughout the master grid as indicated by the lightening bolts shown in the figure.

Figure 9A:
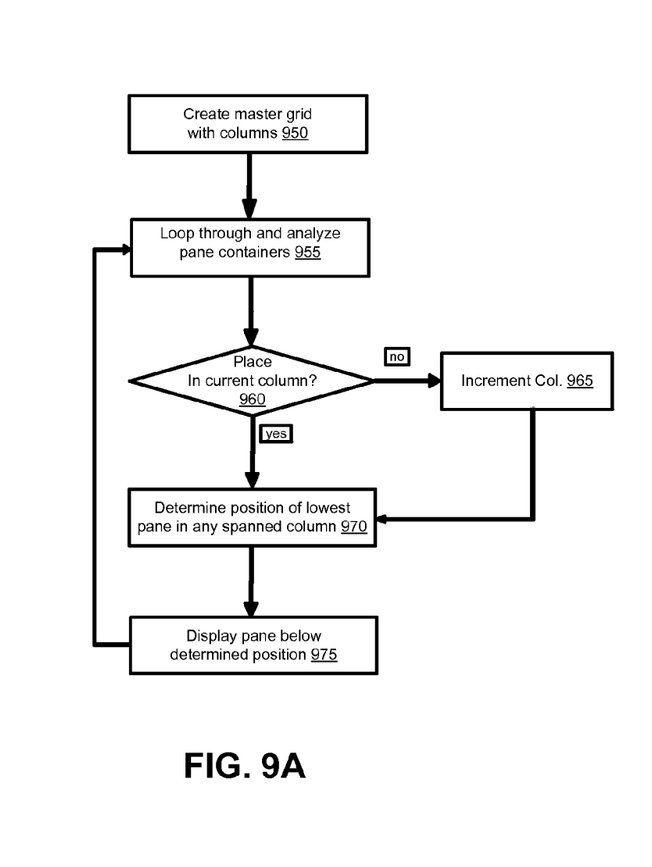
FIG. 9A is a flow chart illustrating an alternative method for displaying component object views as panes in a master grid.
Figure 9B:
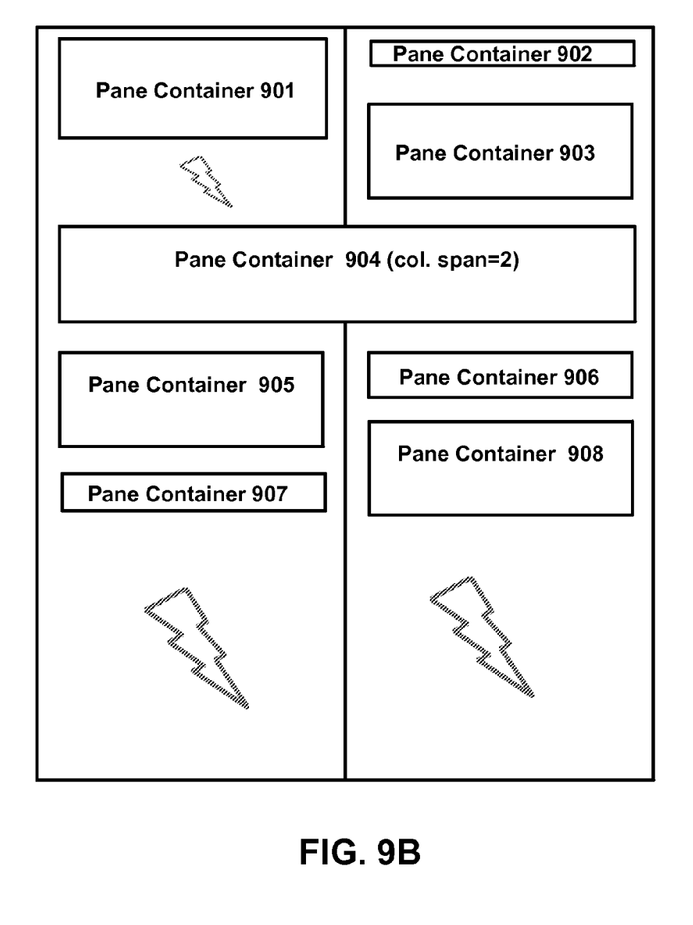
FIG. 9B is a schematic illustration showing how nine component views are displayed in the panes of a master grid according to the method of FIG. 9A.

FIG. 9A is a flow chart illustrating an alternative method for displaying component objects as panes in a master grid. First, a master grid is created with a given number of columns (950). As before, the number of columns can be a default value, provided in a configuration file, or computed based on the number of component object views that need to be displayed. Next, all of the component object views are looped through and processed as panes to be seated in the master grid (955). In particular, each component view's column declaration is first analyzed to determine whether the view should be placed in a pane in the current column of the master grid (960). If so, the component view's column and column span declarations are used to determine the position of the lowest pane in any column that is spanned by the view (970). If instead, the view should be placed in another column of the master grid, the column number of the master grid is first incremented (965), and then the position of the lowest pane in any column that is spanned by the view is determined (970). Finally, the view is displayed in a pane that is placed below the position of the lowest pane in any column that is spanned by the view (975), and the next component object view (if any) is analyzed to determine where it should be seated in the master grid (955). When all of the component views have been processed as described above, a master view such as shown in FIG. 9B results.

FIG. 9B is a schematic illustration showing the panes of FIG. 8B displayed as newspaper elements according to the method of FIG. 9A. As shown in FIG. 9B, each of the nine component views is displayed in one of eight pane containers labeled 901-908, which have been placed in the master grid using only the column and column span declarations of the component views they contain. Note that by using only the column and column span declarations, the pane seating method disclosed in FIG. 9A reduces a lot of the white space that had previously been distributed throughout the master grid, moving it to the bottom of the master grid where it can be easily eliminated, e.g., by making the grid smaller.

In some embodiments, containers for the component object views may not directly support hypertext mark-up language or HTML content in the views. Given the important and ubiquitous use of HTML in modern business applications, a special container can be constructed with an embedded frame that allows HTML content to appear as a seamless part of the container. This can be achieved, for example, by applying various functions that are applied to the container (e.g., scrolling or re-sizing) on the embedded frame that displays the HTML as shown in FIG. 10.

Figure 10:
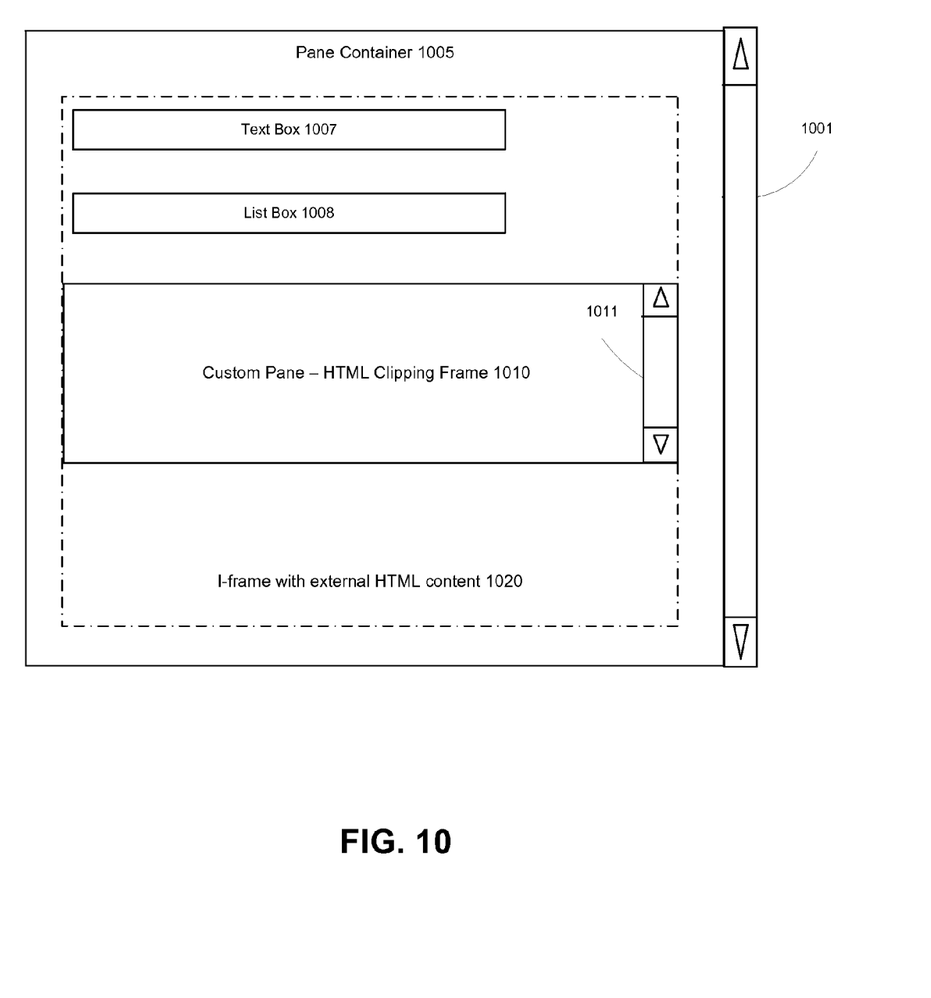
FIG. 10 is a schematic illustration of a special purpose pane container for displaying embedded HTML content.

FIG. 10 is a schematic illustration of a special purpose pane container for displaying embedded HTML content. One of the most ubiquitous sources of data and information today is the world wide web. Thus, end users should be able to include HTML content from the world wide web as a data source for one or more component objects. To view such content, a custom pane 1010 can be embedded in a pane container 1005. The custom pane 1010 acts as a clipping frame for an iframe 1020 that is embedded in pane container 1005 and that contains the HTML content. In addition to custom clipping pane 1010, pane container 1005 can include other view components such as a text box 1007 and a list box 1008. Text box 1007 can be used, for example, to search for terms in the HTML content contained in embedded iframe 1020, while list box 1008 can contain a list of prior searches made of the embedded HTML content.

Pane container 1005 can include a scroll bar 1001, while custom clipping pane 1010 can include a scroll bar 1011. An end user looking at pane container 1005 should view the entire pane and its contents, including the HTML content embedded in iframe 1020 as a seamless and cohesive whole. Thus, when the user scrolls the scroll bar 1001 in a given direction, all of the content of pane container 1005 should move in the opposite direction in a uniform and seamless way. For example, when a user scrolls upward in pane container 1005, the text box 1007, list box 1008, and custom clipping pane 1010 should all move uniformly downward. And, when the custom clipping pane 1010 reaches the bottom of pane container 1005, it should uniformly decrease in size until it ultimately "disappears" behind the lower edge of pane container 1005. Similarly, when a user scrolls downward in pane container 1005, the text box 1007, list box 1008, and custom clipping pane 1010 should all move uniformly upward. And, when the custom clipping pane 1010 reaches the top of pane container 1005, it should again uniformly decrease in size until it ultimately "disappears" behind the upper edge of pane container 1005.

Of course, the whole time custom clipping pane 1010 is moving within pane container 1005, the HTML content displayed by custom clipping pane 1010 should remain the same. Thus, when an end user scrolls (via scrollbar 1001) the contents of pane container 1005 in a given direction, in addition to the text box 1007, list box 1008 and custom clipping pane 1010, the iframe 1020 must also seamlessly move in the opposite direction so that the HTML content of iframe 1020 that is seen through the moving custom clipping frame 1010 remains the same.

As noted above, in addition to scrollbar 1001 for scrolling its own content, pane container 1005 includes a scrollbar 1011 for scrolling the content of custom clipping pane 1010. Thus, when an end user scrolls upward using scrollbar 1011, custom clipping pane 1010 remains in place in pane container 1005, but iframe 1020 moves downward in pane container 1005, so that it appears to the user that the HTML content embedded in iframe 1020 is moving upward. Similarly, when an end user scrolls downward using scrollbar 1011, custom clipping pane 101 remains in place but iframe 1010 moves upward in pane container 1005, so that it appears to the user that the HTML content embedded in iframe 102- is moving downward.

In addition to moving custom clipping pane 1010 and iframe 1020 to mimic scrolling functionality within pane container 1005, custom pane 1010 and iframe 1020 can be resized, rotated, or moved about within the graphical user interface in client runtime 110 to mimic the resizing, rotation, and movement of pane container 1005 within the graphical user interface.

The methods and apparatus described herein may be implemented in digital electronic circuitry, or in computer hardware, firmware, software, or in combinations of them. They may be implemented as a computer program product, i.e., as a computer program tangibly embodied in a machine-readable storage device for execution by, or to control the operation of, a processor, a computer, or multiple computers. Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). The method steps may be performed in the order shown or in alternative orders.

A computer program, such as the computer program(s) described above, can be written in any form of programming language, including compiled or interpreted languages, and can be deployed in any form, including as a stand-alone program or as a module, component, subroutine, plug-in or other unit suitable for use in a computing environment. A computer program can be deployed to be executed on one computer or on multiple computers at one site or distributed across multiple sites and interconnected by a communications network. Processors suitable for the execution of a computer program include, by way of example, both general and special purpose microprocessors, and any one or more processors of any kind of digital computer, including digital signal processors. Generally, a processor will receive instructions and data from a read-only memory or a random access memory or both.

Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks. Machine readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the methods and apparatus may be implemented on a computer having a display device, e.g., a cathode ray tube (CRT) or liquid crystal display (LCD) monitor, for displaying information to the user and a keyboard and a pointing device, e.g., a mouse, trackball or touch pad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The methods and apparatus described may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer implemented method for overlaying the display of a first graphical object with the display of a second graphical object so that the first and second graphical objects appear to be an integrated graphical object, comprising:
   displaying the first graphical object in a graphical user interface, wherein the first graphical object does not support the display of hypertext mark-up language (HTML) and is configured to be directly manipulated in the graphical user interface by a user, and
   displaying the second graphical object in the graphical user interface, wherein the second graphical object supports the display of HTML content and is configured to be automatically manipulated by the computer when the first graphical object is directly manipulated in the graphical user interface by the user, and
   wherein when the first graphical object is displaced in a first direction by a first amount by the user, the second object is automatically displaced opposite the first direction by the first amount by the computer, and
   wherein displaying the first graphical object in the graphical user interface includes displaying the first graphical object in a pane container,
   wherein the first graphical object includes a clipping frame embedded in the pane container,
   wherein the second graphical object includes an iframe that contains HTML content viewable through the clipping frame embedded in the pane container, and
   wherein when contents of the pane container including the clipping frame are moved in one direction, the iframe automatically moves in the opposite direction so that the HTML content of the iframe that is seen through the moving clipping frame remains the same.

2. The computer implemented method of claim 1, wherein displaying the second graphical object further comprises displaying the clipping frame that reveals a portion of the HTML content of the iframe.

3. The computer implemented method of claim 2, wherein the first graphical object is directly manipulated in a first manner in the graphical user interface, further comprising automatically manipulating the second graphical object in the same first manner.

4. The computer implemented method of claim 3, wherein the first manner for directly manipulating the first graphical object includes scrolling the first graphical object in a first direction by a first amount, further comprising:
 displacing the content of the first graphical object in the graphical user interface by the first amount and in a direction that is opposite the first direction; and
 displacing the second graphical object in the graphical user interface by the first amount and in a direction that is opposite the first direction.

5. The computer implemented method of claim 4, wherein displacing the second graphical object by the first amount and in a direction that is opposite the first direction comprises displacing the iframe and the clipping frame by the first amount and in a direction that is opposite the first direction.

6. The computer implemented method of claim 3, wherein the first manner for directly manipulating the first graphical object includes resizing the first graphical object in a first dimension in the graphical user interface by a first amount, further comprising automatically resizing the second graphical object in the graphical user interface by the same first amount in the same dimension.

7. A computer program product, tangibly embodied on a machine readable medium, comprising instructions for causing a programmable processor to:
 display a first graphical object in a graphical user interface, wherein the first graphical object does not support the display of hypertext mark-up language (HTML) and is configured to be directly manipulated in the graphical user interface by a user; and
 display a second graphical object in the graphical user interface, wherein the second graphical object supports the display of HTML content and is configured to be automatically manipulated by the computer when the first graphical object is directly manipulated in the graphical user interface by the user, and
 wherein when the first graphical object is displaced in a first direction by a first amount by the user, the second object is automatically displaced opposite the first direction by the first amount by the computer, and
 wherein displaying the first graphical object in the graphical user interface includes displaying the first graphical object in a pane container,
 wherein the first graphical object includes a clipping frame embedded in the pane container,
 wherein the second graphical object includes an iframe that contains HTML content viewable through the clipping frame embedded in the pane container, and
 wherein when contents of the pane container including the clipping frame are moved in one direction, the iframe automatically moves in the opposite direction so that the HTML content of the iframe that is seen through the moving clipping frame remains the same.

8. The computer program product of claim 7, wherein the instruction to display the second graphical object further comprises an instruction to display a clipping frame that reveals a portion of the HTML content of the iframe.

9. The computer program product of claim 8, further comprising an instruction to automatically manipulate the second graphical object via the computer in a first manner when the first graphical object is directly manipulated in the graphical user interface in the first manner.

10. The computer program product of claim 9, wherein the first graphical object is directly manipulated in the graphical user interface by scrolling the first graphical object in a first direction by a first amount, further comprising instructions operable to cause the programmable processor to:
 displace the contents of the first graphical object in the graphical user interface by the first amount and in a direction that is opposite the first direction; and
 displace the second graphical object in the graphical user interface by the first amount and in a direction that is opposite the first direction.

11. The computer program product of claim 10, wherein the instruction to displace the second graphical object by the first amount and in a direction that is opposite the first direction comprises an instruction to displace the iframe and the clipping frame by the first amount and in a direction that is opposite the first direction.

12. The computer program product of claim 9, wherein the first graphical object is directly manipulated in the graphical user interface by resizing the first graphical object in a first dimension by a first amount, further comprising instructions operable to cause a programmable processor to resize the second graphical object in the graphical user interface by the same first amount.

* * * * *